(No Model.)
A. J. TIBBITS.
BROADCAST SEED PLANTER.
No. 265,466. Patented Oct. 3, 1882.
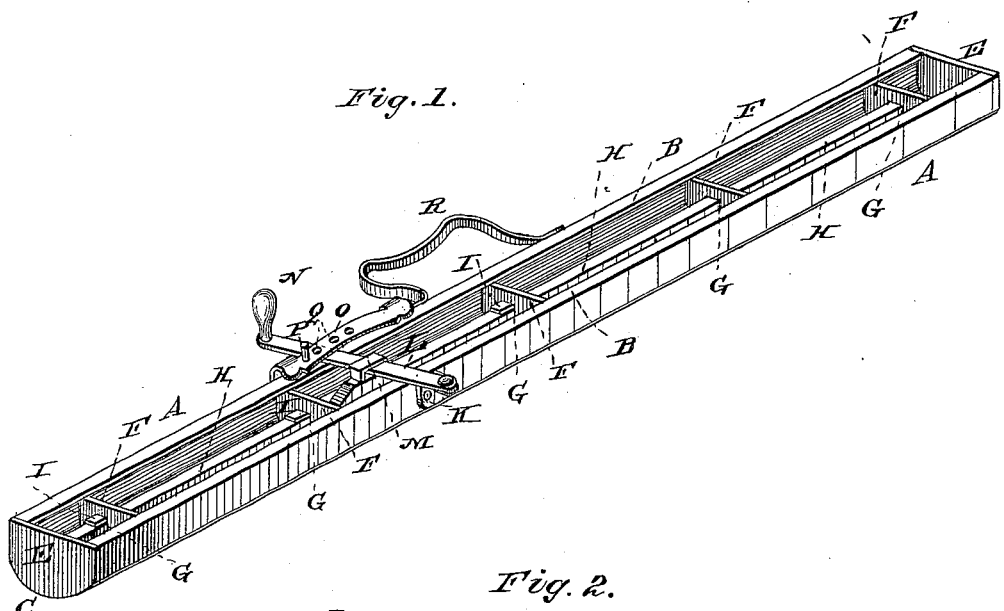
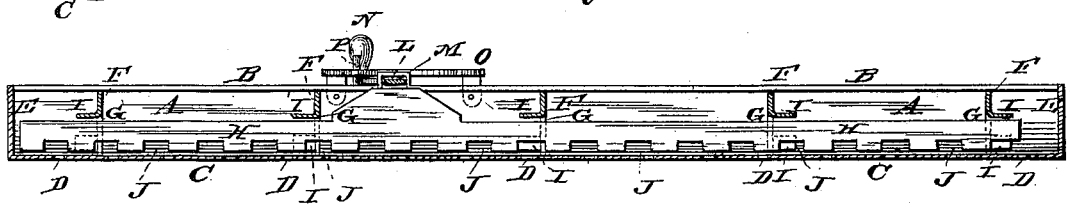
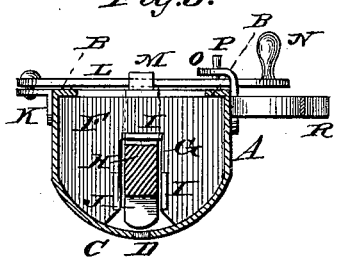
WITNESSES:
Fred. G. Dieterich
P. C. Dieterich
INVENTOR:
Artemus J. Tibbits
by C. A. Snow & Co.
ATTORNEYS.

UNITED STATES PATENT OFFICE.

ARTEMUS J. TIBBITS, OF SOUTHFIELD, MICHIGAN.

BROADCAST SEED-PLANTER.

SPECIFICATION forming part of Letters Patent No. 265,466, dated October 3, 1882.

Application filed February 10, 1882. (No model.)

*To all whom it may concern:*

Be it known that I, ARTEMUS J. TIBBITS, of Southfield, in the county of Oakland and State of Michigan, have invented certain new and useful Improvements in Broadcast Seed-Planters; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a longitudinal vertical sectional view, and Fig. 3 is a vertical cross-section.

Corresponding parts in the several figures are denoted by like letters of reference.

This invention relates to a broadcast seed-planter to be operated by hand for sowing grass, turnip, and other seed; and it consists in certain improvements in the construction of the same, which will be hereinafter fully described, and particularly pointed out in the claim.

In the drawings hereto annexed, A represents the seed box or trough, which is to be made of a single piece of sheet metal bent, as shown in the cross-section, Fig. 3, in such a manner as to form a gutter-shaped trough, provided at its upper edges with inturned flanges B B, and having a rounded or concave bottom, C, provided with a longitudinal row of openings, D, for the escape of the seed. The box or trough A is provided with suitable ends, E, and with a series of partitions, F, made of sheet metal, and having openings or slots G to receive the seed-slide, H, which consists of a wooden board or slat placed on edge longitudinally in the box A, so as to be capable of sliding or reciprocating therein. The sides and upper edges of the guide-slots G in the partitions F are provided with flaps or flanges I, formed by cutting or stamping out the said slats. The flaps I press against the side and top of the seed-slide, and serve to take up the wear upon the latter, thus keeping it always in its true position. The under side of the seed-slide is rounded or smoothed to avoid cutting and crushing the seed, and it is provided with a series of recesses, J, to enable the seed to pass under the slide and be pushed by the latter out through the openings D.

To a bracket, K, upon the front side of the seed box or trough is pivoted a lever, L, passing through a staple, M, upon the upper side of the seed-slide, and provided at its rear end with a handle, N. The rear end of the lever L passes under a strap or guard, O, secured upon the rear side of the seed-box, and having a series of openings, Q, in any one of which a pin, P, may be placed to regulate the throw of the lever and the extent of the movement of the seed-slide, thus regulating the quantity of seed sown.

Upon the rear side of the seed-box is secured a bail, R, to support the machine against the body of the operator who carries it, supported by a cord over his shoulders.

From the foregoing description, taken in connection with the drawings hereto annexed, the operation of my invention will be readily understood. It is simple, inexpensive, durable, and easily manipulated. Owing to the curved shape of the bottom of the seed-box the last of the seed may readily escape, and the flanges at its upper edges prevent it from being spilled. The seed-slide is always, by the flaps or flanges I, kept in its true position, and being set on edge, as described, and having its lower edge rounded, it will not obstruct the flow of the seed, nor will it cut, crush, or otherwise injure it.

Having thus described my invention, I claim and desire to secure by Letters Patent of the United States—

As an improvement in hand seed-planters, the concave box or trough A, having flanges B, perforations D, and partitions F, provided with guide-slots G and flaps or flanges I, in combination with the seed-slide H, having its lower edge rounded, and provided with recesses J and the operating-lever L, as and for the purpose set forth.

In testimony that I claim the foregoing as my own I have hereto affixed my signature in presence of two witnesses.

ARTEMUS J. TIBBITS.

Witnesses:
   J. R. LITTELL,
   WM. BAGGER.